April 21, 1953     W. E. MOLLENAUER     2,635,814
THERMAL CONTROL MEANS FOR HOUSE HEATING SYSTEMS
Filed Feb. 28, 1950
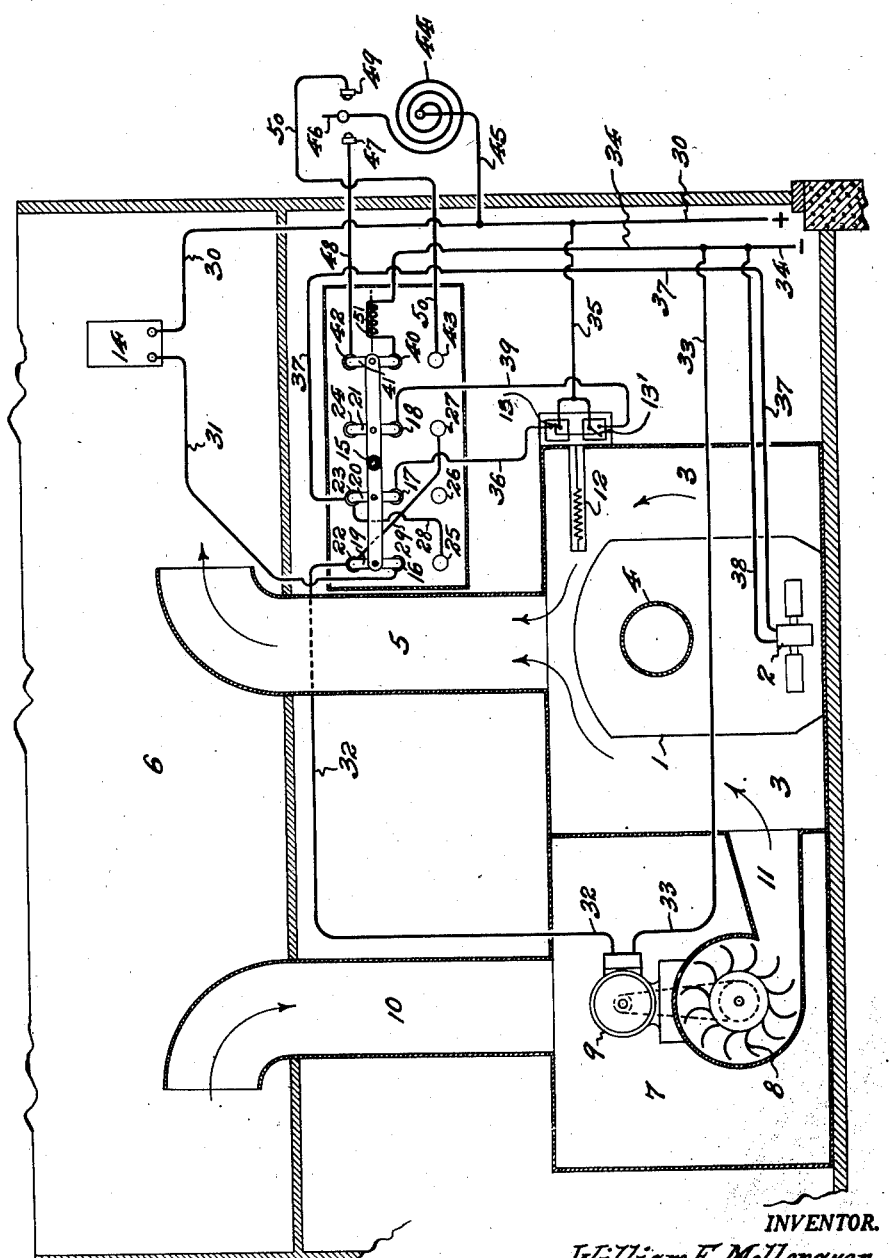
INVENTOR.
William E. Mollenauer,
BY
Attorney Patented Apr. 21, 1953

2,635,814

UNITED STATES PATENT OFFICE 2,635,814

THERMAL CONTROL MEANS FOR HOUSE HEATING SYSTEMS

William E. Mollenauer, Short Hills, N. J.

Application February 28, 1950, Serial No. 146,872

4 Claims. (Cl. 236—9)

This invention relates to improvements in means for controlling the operation of a heat source and heat distributing means of a house heating system; and the invention has reference, more particularly, to control means for a house heating system of the circulated hot air type.

A circulated hot air heating system usually comprises a furnace within an air heating chamber and a power driven fan for circulating the air between said chamber and the house space to be heated.

In some cases, the operation of the furnace is directly controlled by a thermostat located within the house space to be heated (ordinarily referred to as a room thermostat), and the operation of the air circulating fan may be controlled by a thermostat responsive to temperature within the heating chamber (ordinarily referred to as a limit switch). In other cases, the operation of the air circulating fan is directly controlled by the room thermostat, and the furnace operation by a limit switch within the air heating chamber.

The first aforesaid method of control works with reasonable efficiency during mild or relatively warm periods of winter weather, but is neither efficient nor satisfactory during severe or relatively cold periods of winter weather, since it permits too wide a fluctuating range of temperature variation within the house space to be heated. On the other hand, the second aforesaid method of control may be quite efficient during periods of severe or relatively cold winter weather, but is unsatisfactory in operation during periods of mild or relatively warm winter weather, because it permits excessive heat generation by the furnace; that is, more heat than necessary for house space heating under such mild weather conditions, and consequently results in undue consumption and waste of furnace firing fuel.

Having the above in view, it is the purpose of this invention to provide novel means for controlling a heat source (especially of the liquid or gas fuel fired furnace type) and the associated hot air circulating fan in such manner that the operation of these agencies can be made to better and more economically respond to house heat requirements both during mild or relatively warm periods of winter weather and during severe or relatively cold periods of the winter heating season.

Another object of this invention is to provide means in electrical circuit association with the room thermostat and furnace limit switch means, whereby these control elements can be selectively brought into operation, either manually or automatically, so that, under mild or relatively warm winter conditions, the furnace is directly controlled by the room thermostat and the hot air circulating fan by the furnace limit switch, but, under relatively cold winter conditions, the hot air circulating fan is directly controlled by the room thermostat and the furnace by a limit switch.

Other objects of this invention, not at this time more particularly enumerated, will be understood from the following detailed description of the same.

The invention is illustrated in the accompanying drawing which schematically shows a heating system of the circulated hot air type as equipped with the novel selective electrical control means according to this invention.

In the drawing, the electrical control means, for the purpose of illustrating the fundamental principles and novelty of the invention, is shown in a much simplified form and arrangement, such as would be operated directly from a 110 volt power source; it will be understood, however, that, in practice, the control circuits may be more complicated, without departing from the fundamental principles of the invention, by inclusion of voltage modifying transformers, additional fire limit switch means, or other desired additional circuit detail.

Referring now to the accompanying drawing, the reference character 1 indicates a furnace for service as a heat source, which is adapted to be fired by a liquid or gas fuel burner 2. The furnace 1 is mounted within and thus surrounded by an air heating chamber 3; the furnace smoke pipe 4 being arranged to extend exteriorly from the latter to a chimney or flue (not shown). From the heating chamber 3 a hot air delivery duct 5 extends to and in communication with the house space 6 which is to be heated. Associated with the air heating chamber 3 is a fan chamber 7 with which the intake side of an air impeller fan 8 communicates. Fan 8 is driven by an electric motor 9. Leading from the house space 6 to the fan chamber 7 is an air return duct 10. The fan discharge 11 communicates with the interior of the air heating chamber 3, all whereby, in operation of the heating system, heated air is circulated between the air heating chamber 3 and said house space 6 to be heated.

Mounted in association with the furnace and air heating chamber is a thermostatically actuated limit switch means, the actuating thermostatic element 12 of which extends within the interior of the air heating chamber 3 so as to be responsive to temperature variation of the air moving therethrough. Located within the house space 6 to be heated is a room thermostat 14. The limit switch means comprises a furnace burner serving, normally closed, limit switch 13 and a fan motor serving, normally open, limit switch 13'.

Suitably located within the house served by the heating system, and preferably in the furnace room of the house, is a controller. This controller comprises a multiple pole double throw switch 15, which, in a simple form thereof, includes poles 16, 17 and 18 about which its contact blades 19, 20 and 21 are movable to its respective closed positions. In one closed switch position (e. g. its up-thrown position), the contact blades 19, 20 and 21 respectively engage stationary contacts 22, 23 and 24 and in its opposite closed switch position (e. g. its down-thrown position) said contact blades respectively engage stationary contacts 25, 26 and 27. Stationary contacts 25 and 23 are interconnected by a cross connection or jumper 28, and similarly stationary contacts 27 and 22 are interconnected by a cross connection or jumper 29.

The controller switch is connected in novel electrical circuit relation to the room thermostat 14 and to the air heating chamber associated limit switch means as follows:

The incoming power line 30 is connected to one pole of the room thermostat 14, and the other pole of the latter is connected to pole 16 of the controller switch by circuit wire 31. The stationary contact 22 of the controller switch is connected to one pole of the fan motor 9 by circuit wire 32, and the other pole of said fan motor is connected by circuit wire 33 to the outgoing power line 34.

One pole of the normally closed burner serving limit switch 13 is connected to the incoming power line 30 by circuit wire 35, and the other pole of said burner serving limit switch is connected by circuit wire 36 to the pole 17 of the controller switch. The stationary contact 23 of the controller switch is connected by circuit wire 37 to one pole of the furnace burner 2, and the opposite pole of the furnace burner is connected to the outgoing power line 34 by circuit wire 38. One pole of the normally open fan serving limit switch 13' is connected to the incoming power line 30, and the other pole of said fan serving limit switch 13' is connected by circuit wire 39 to pole 18 of the controller switch.

As thus far described, the control system is adapted for manual operation whereby the controller switch is selectively thrown by hand to one or the other of its operative closed switch positions, although it is preferable and the invention further includes that the controller switch be automatically operated by means responsive to outdoor temperature variation, as will be subsequently herein set forth, so that the control system becomes fully automatic.

When outdoor temperature during the heating season drops below a selected mean winter temperature, e. g. 45° F., best efficiency of the heating system will be obtained if the air circulating fan 8 is under the control of the room thermostat 14 and the furnace burner 2 is under the control of the burner serving limit switch 13. Therefore, under such conditions, the control switch 15 is moved to its up-thrown or cold weather service position. In such cold weather service position of the control switch, current is delivered through the room thermostat 14 to the fan motor 9 from the ingoing power line 30 by way of circuit wire 31 through pole 16, contact blade 19 and contact 22 of the control switch, and thence to fan motor 9 by circuit wire 32, the circuit being completed from fan motor 9 to outgoing power line 34 by circuit wire 33. At the same time, by such cold weather service position of the control switch, current is delivered from the power line 30 under the control of the burner serving limit switch 13 to the furnace burner 2 through circuit wires 35, said limit switch 13 and circuit wire 36 to pole 17, contact blade 20 and contact 23 of the control switch, thence to the furnace burner 2 by circuit wire 37, the circuit being completed from said burner 2 to the outgoing power line 34 by circuit wire 38.

When the system operates through the cold weather service position of the control switch, the operating burner 2 causes the furnace to supply heat to the air heating chamber 3 at all times within the setting of the burner serving limit switch 13, so that the air in the heating chamber 3 is kept hot. Consequently, when the room thermostat 14 calls for heat, the fan 8 is instantly put in operation to deliver the heated air from the heating chamber 3 to the space 6 to be heated, and said space is not permitted to cool below the room thermostat heat demand setting. By reason of this, but a minimum variation of temperature of space 6 occurs within the differential limits for which the room thermostat is adjusted. When heat demand by the room thermostat is satisfied, said room thermostat operates to shut off the fan 8, and the latter does not again operate until the temperaure of space 6 drops to the heat demand setting of the room thermostat. The room thermostat may thus operate on a differential of as little as 1° F. Since the furnace continues in operation within the settings of the burner serving limit switch 13, there is the added advantage that some heat will be delivered to the space 6 to be heated even when the fan is idle due to thermal siphon effect, and therefore temperature drop within said space 6 to be heated will be retarded, or in other words will not be abrupt. Thus a substantially uniform temperature is constantly maintained within the space 6 to be heated during cold winter outdoor temperature.

When the outdoor temperature during the heating season rises above the selected means winter temperature, e. g., above 45° F., best efficiency of the heating system will be obtained if the furnace burner 2 is under control of the room thermostat 14 and the air circulating fan 8 is under the control of the fan serving limit switch 13'. Therefore, under such conditions, the control switch 15 is moved to its down-thrown or mild weather service position. In such mild weather position of the control switch, current is delivered from the power line 30 under the control of the fan serving limit switch 13' to the fan motor 9 through circuit wires 35, said limit switch 13' and circuit wire 39 to pole 18, contact blade 21 and contact 27, jumper wire 29, and contact 22 of the control switch, and thence to fan motor 9 by circuit wire 32, the circuit being completed from fan motor 9 to outgoing power line 34 by circuit wire 33. At the same time, by such mild weather service position of the control switch, current is delivered through the room thermostat 14 to the burner 2 from the ingoing power line 30 by way of circuit wire 31 through pole 16, contact blade 19, contact 25, jumper wire 28 and contact 23 of the control switch, and thence to burner 2 by way of circuit wire 37, the circuit being completed from burner 2 to the outgoing power line 34 by circuit wire 38.

When the system operates through the mild weather service position of the control switch, the room thermostat 14 controls the operation of the furnace and consequently heat generation, while the means for circulating the generated heat, viz. the fan 8, is controlled by the normally open limit switch 13' which responds to temperature of the air in the air heating chamber 3. Assuming the room thermostat 14 to be set for a differential of 1° F., and to hold an average temperature approximating 72° F. in the space 6 to be heated, as the temperature in said space 6 drops to 72° F., the room thermostat functions to start the burner 2 so that the furnace supplies heat to the air in the heating chamber 3. Since, however, during a shut-off period of the burner 2, the temperature of the air in the heating chamber 3 will drop, it requires an appreciable time, after the burner 2 is restarted, to supply sufficient heat to raise the temperature of the air in the air heating chamber 3 to the point which operates to close the fan serving thermostat 13', and thus start the air circulating fan 8. During this lapse of time, the temperature in the space 6 to be heated will drop somewhat below 72° F., but, after the fan starts, heat is again delivered so that the temperature in space 6 to be heated rises until the room thermostat operates to again shut off the furnace burner 2. When heat generation is thus interrupted, the fan nevertheless continues to operate to deliver air from the air heating chamber 3 until the air temperature in the latter drops and the fan serving limit switch 13' opens to again interrupt fan operation, whereupon the cycle of control is repeated. It will thus be understood that the mild weather control phase of the control system allows a wider temperature variation range within the space 6 to be heated than does the cold weather control phase, and consequently demand for heat generation is so managed that not only is temperature comfort sufficiently maintained in the space 6 to be heated, but is so maintained with greater economy in fuel consumption.

As above stated, it is preferable that the control system of this invention be operated automatically in response to variations of outdoor temperature, therefore the invention includes the following additional means to attain such automatic operation.

The control switch 15 is provided with an additional pole 40 and contact blade, 41, said contact blade being adapted to engage a stationary contact 42 in the up-thrown or cold weather service position of the control switch, and a stationary contact 43 in the down-thrown or mild weather service position of said control switch. Mounted exteriorly of the house, the heating of which is managed by the control system, is an outdoor thermostat 44 which is connected to the ingoing power line 30 by circuit wire 45. Said thermostat 44 is provided with a contact arm 46. Opposed to one side of the contact arm 46, subject to engagement thereby when said thermostat responds to ambient temperature drop below a selected mean, is a contact 47, which is connected by circuit wire 48 to the stationary contact 42 of the control switch. Opposed to the opposite side of the contact arm 46 of the outdoor thermostat 44, subject to engagement thereby when said thermostat responds to ambient temperature rise above a selected mean, is a contact 49 which is connected by circuit wire 50 to the stationary contact 43 of the control switch 15. Connected in circuit between the pole 40 of the control switch and the outgoing power line 34 is solenoid or other suitable electrically actuated means 51 which is operative, when energized, to throw the control switch 15 from one service position to the other accordingly as it is desired to have said control switch disposed in its cold weather service position or its mild weather service position as called for by outdoor temperature drop or rise.

Having now described my invention, I claim:

1. In a heating system having an electrically controlled source of heat and electrically controlled means for distributing heat from the source to space to be heated, thermostatic means responsive to temperatures within the space to be heated, thermostatic means responsive to temperatures at the source of heat, electrical circuits for heat source control and for heat distributing means control, said circuits including a double throw control switch means which is operative in one closed position thereof to connect the first mentioned thermostatic means in a heat source control circuit and the second mentioned thermostatic means in a heat distributing means control circuit, and said control switch means being operative in the other closed position thereof to reverse said circuit relations of said respective thermostatic means.

2. In a heating system as defined in claim 1, an electrically actuated means for moving the control switch means from one closed position thereof to the other, and thermostatic means responsive to outdoor temperatures for governing the operation of said control switch moving means.

3. In a heating system of the circulating hot air type, an air heating chamber in air delivering communication with space to be heated, a heat source fired by an electrically controlled fuel burner within said air heating chamber, an electric motor actuated air circulating fan in communication between said space to be heated and said air heating chamber, thermostatic means responsive to temperatures within the space to be heated, thermostatic means responsive to temperatures of air within the air heating chamber, electrical circuits for heat source burner control and for fan motor control, said circuits including a double throw control switch means which is operative in a closed cold weather service position thereof to connect the first mentioned thermostatic means in the fan motor control circuit and the second mentioned thermostatic means in the furnace burner control circuit, and said control switch being operative in a closed mild weather service position thereof to reverse said circuit relations of said respective thermostatic means.

4. In a heating system as defined in claim 3, an electrically actuated means for moving the control switch means from one closed position thereof to the other, and thermostatic means responsive to outdoor temperatures for governing the operation of said control switch moving means.

WILLIAM E. MOLLENAUER.

References Cited in the file of this patent

UNITED STATES PATENTS

| Number | Name | Date |
|---|---|---|
| 1,993,262 | Denison | Mar. 5, 1935 |
| 2,284,674 | Murdock | June 2, 1942 |